Figure 1:
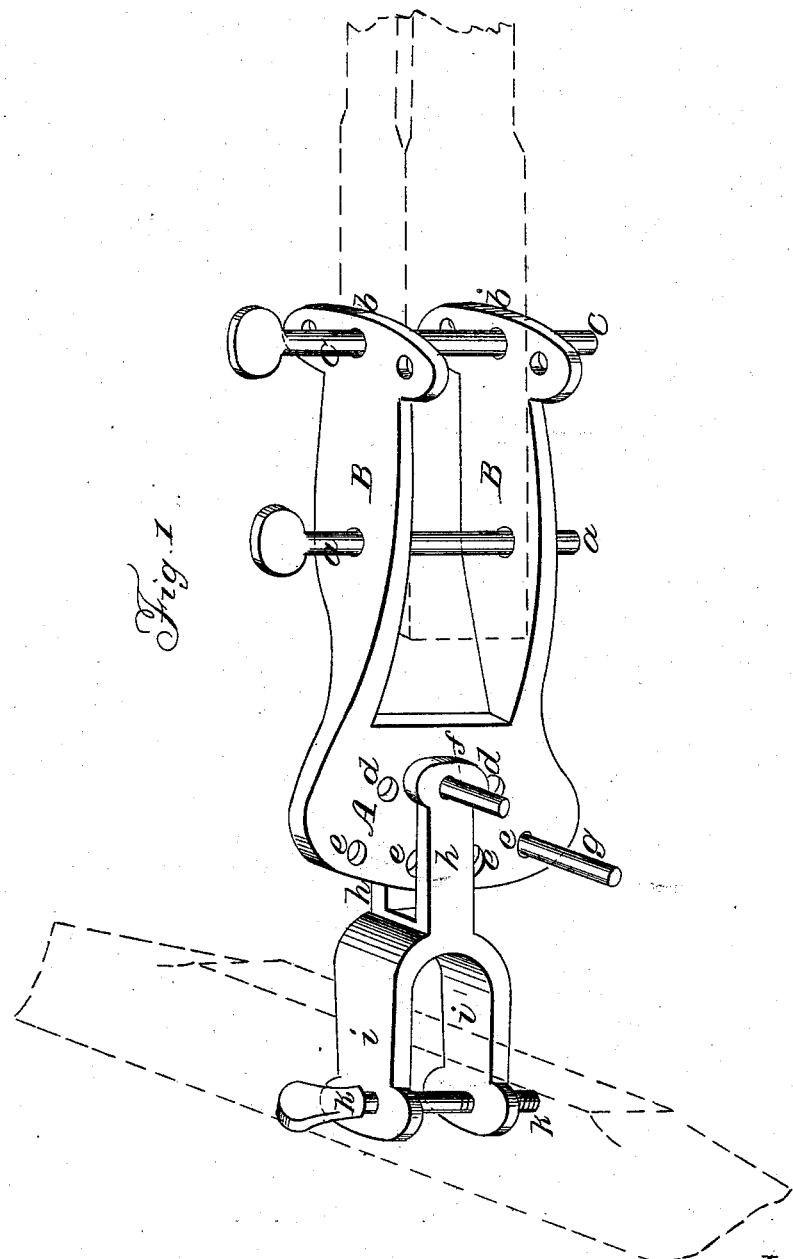

L. M. STEARNS.
Plow-Clevis.

No. { 1,485, 32,489. }

Patented June 4, 1861.

Witnesses.

Inventor.

UNITED STATES PATENT OFFICE.

L. M. STEARNS, OF CARDIFF, NEW YORK.

IMPROVEMENT IN PLOWS.

Specification forming part of Letters Patent No. 32,489, dated June 4, 1861.

*To all whom it may concern:*

Be it known that I, L. M. STEARNS, of Cardiff, in the county of Onondaga and State of New York, have invented a new and Improved Plow-Clevis; and I do hereby declare that the following is a full, clear, and exact description thereof, reference being had to the accompanying drawing, making a part of this specification.

Said drawing is a perspective view of the improved clevis.

The object of this invention is to attach a whiffletree to a plow-clevis in such a manner that the whiffletree will not get under the horses' feet in turning the plow, and also that the team will have a much better purchase on the plow in turning it and keeping the beam steady in heavy plowing. At the same time the improved clevis will admit of all the adjustments desirable, and it will be strong and substantial.

The clevis-plate A is formed on the ends of two plates, B B, as shown in the drawing, which plates embrace the end of the plow-beam, and are connected to this beam by a fulcrum-pin, $a$, which passes down through the plates and beam. On the rear ends of plates B B perforated sector portions $b\ b$ are formed for receiving a removable pin, $c$, which passes vertically through the plow-beam and connects the plates B B rigidly thereto. The holes through the rear ends of plates B B will admit of these plates being adjusted at various angles with the plow-beam for changing the line of draft of the plow.

The clevis A is simply a flat plate perforated at $d\ d\ d$ and also at $e\ e\ e\ e$, to receive the transverse coupling-pin $f$ and the transverse check-pin $g$. The pin $f$ connects to the clevis an iron which receives and holds the whiffletree. This iron consists of two forked arms, $h\ h$, which embrace the clevis A, and two forked arms, $i\ i$, which embrace the whiffletree. The arms $h\ h$ are pivoted by the pin $f$ to the clevis A and to the arms $i\ i$. The whiffletree is pivoted by a vertical pin, $k$. The pin $f$ allows the whiffletree to move up and down, and the pin $k$ allows the whiffletree to vibrate freely. The pivot-connection of the arms $h\ h$ can be adjusted either up or down by removing the pin $f$ and introducing it through another one of the holes $d\ d\ d$, and as these holes are made some distance from the front edge of the clevis the arms $i\ i$ or $h\ h$ will not be allowed to have any lateral play on the clevis. The pin $g$ is passed through one of the holes $e\ e\ e\ e$ below the arms $h\ h$, and this pin thus keeps the arms up and prevents the whiffletree from falling down under the horse's feet in turning the plow or when the horse is not pulling. This pin $g$ is placed a suitable distance below the arms $h\ h$ to allow the plow-beam a free vertical play, so that the plowman can control the plow with the same facility as where the common clevis is used.

Now, it will be seen from the foregoing description, that I combine all the advantages of the most improved clevis with a means whereby the animals drawing the plow will have a greater purchase in turning the plow, as the whiffletree, being prevented from swinging as hitherto, will divide the draft more uniformly on each side of the plow-beam, and the plow can be kept very steady in turning. The pin $g$ will also prevent the whiffletree from falling under the horses' feet—an objection which attends the chains and hooks commonly used.

Having thus fully described my invention, what I claim as new, and desire to secure by Letters Patent, is—

Combining with clevis A, constructed and applied to the plow-beam as herein described, the forked coupling-iron consisting of the arms $h\ h$, pivoted to the clevis by pin $f$, and arms $i\ i$, embracing the whiffletree and pivoted thereto by the pin $k$, and the check-pin $g$, all arranged and operating as herein described.

L. M. STEARNS.

Witnesses:
DANIEL GARFIELD,
ANDREW BAILEY.